US010939535B1

(12) United States Patent
Ghahramani

(10) Patent No.: US 10,939,535 B1
(45) Date of Patent: Mar. 2, 2021

(54) FORWARD FACING MOTION-DETECTING LIGHTING SYSTEM

(71) Applicant: Great Home Tek Inc., San Jose, CA (US)

(72) Inventor: Alan Ghahramani, San Jose, CA (US)

(73) Assignee: Great Home Tek, Inc., San Jose, CA (US)

( * ) Notice: Subject to any disclaimer, the term of this patent is extended or adjusted under 35 U.S.C. 154(b) by 0 days.

(21) Appl. No.: 16/680,191

(22) Filed: Nov. 11, 2019

(51) Int. Cl.
   *H05B 47/19* (2020.01)
   *F21V 23/04* (2006.01)
   *F21S 8/00* (2006.01)

(52) U.S. Cl.
   CPC .......... *H05B 47/19* (2020.01); *F21V 23/0442* (2013.01); *F21S 8/033* (2013.01)

(58) Field of Classification Search
   CPC ....... H05B 47/19; F21V 23/0442; F21S 8/033
   See application file for complete search history.

(56) References Cited

U.S. PATENT DOCUMENTS

| | | | | | |
|---|---|---|---|---|---|
| 4,223,598 | A | * | 9/1980 | Suzuki | B03C 3/32 422/121 |
| 4,786,812 | A | * | 11/1988 | Humphreys | A61L 9/20 250/455.11 |
| 5,702,176 | A | * | 12/1997 | Engle | F21S 2/00 362/219 |
| 6,213,622 | B1 | * | 4/2001 | Shimada | F21V 33/006 362/146 |
| 6,536,924 | B2 | * | 3/2003 | Segretto | F21S 4/28 362/345 |
| 7,270,443 | B2 | * | 9/2007 | Kurtz | F21S 8/00 362/217.05 |
| 7,824,056 | B2 | * | 11/2010 | Madireddi | F21V 15/01 362/125 |
| 7,891,841 | B2 | * | 2/2011 | Levine | F21S 9/03 362/249.07 |
| 7,922,354 | B2 | * | 4/2011 | Everhart | F21V 23/009 362/235 |
| 8,466,433 | B2 | * | 6/2013 | Ullman | A61L 2/10 250/455.11 |
| 8,581,522 | B2 | * | 11/2013 | Inskeep | A61L 2/10 315/360 |
| 8,912,905 | B2 | * | 12/2014 | Wong | H05B 45/37 340/572.4 |
| 8,939,634 | B2 | * | 1/2015 | Leadford | F21S 2/005 362/647 |
| 9,414,456 | B2 | * | 8/2016 | Wong | F21S 4/28 |
| 9,759,391 | B1 | * | 9/2017 | Shew | F21V 23/023 |
| 9,855,353 | B1 | * | 1/2018 | Stacy | A61L 2/24 |

(Continued)

*Primary Examiner* — Tsion Tumebo
(74) *Attorney, Agent, or Firm* — Patent Ingenuity, P.C.; Samuel K. Simpson

(57) ABSTRACT

A forward facing motion-detecting lighting apparatus includes an enclosure, a light emission window that is positioned within a first cavity of the enclosure, a first surface of the enclosure that surrounds the first cavity along a first plane of the enclosure, a plurality of light emitting diodes that are positioned within the enclosure, and at least one motion sensor that protrudes through a second cavity of the enclosure. The forward facing motion-detecting lighting apparatus has a second surface of the enclosure that surrounds the second cavity along a second plane of the enclosure, the second plane being perpendicular to the first plane.

20 Claims, 13 Drawing Sheets

(56) References Cited

U.S. PATENT DOCUMENTS

| | | | |
|---|---|---|---|
| 9,964,289 B2* | 5/2018 | Pearson | F21V 21/005 |
| 10,222,052 B1* | 3/2019 | Ter-Hovhannisyan | F21S 8/061 |
| 2004/0105264 A1* | 6/2004 | Spero | B60Q 1/04 362/276 |
| 2007/0053188 A1* | 3/2007 | New | B64D 13/00 362/276 |
| 2007/0274067 A1* | 11/2007 | Sloan | F21S 4/26 362/219 |
| 2010/0271804 A1* | 10/2010 | Levine | F21S 4/20 362/35 |
| 2010/0296285 A1* | 11/2010 | Chemel | H05B 47/12 362/235 |
| 2011/0084627 A1* | 4/2011 | Sloan | F21V 7/22 315/297 |
| 2012/0044350 A1* | 2/2012 | Verfuerth | H05B 47/105 348/143 |
| 2016/0003456 A1* | 1/2016 | Xu | F21V 23/003 362/249.06 |
| 2016/0178173 A1* | 6/2016 | Yadav | F21V 23/005 362/231 |
| 2016/0313636 A1* | 10/2016 | Chien | F21S 9/022 |
| 2017/0231403 A1* | 8/2017 | Eget | A47F 3/001 454/192 |
| 2019/0113215 A1* | 4/2019 | Coleman | F21V 23/0471 |

* cited by examiner

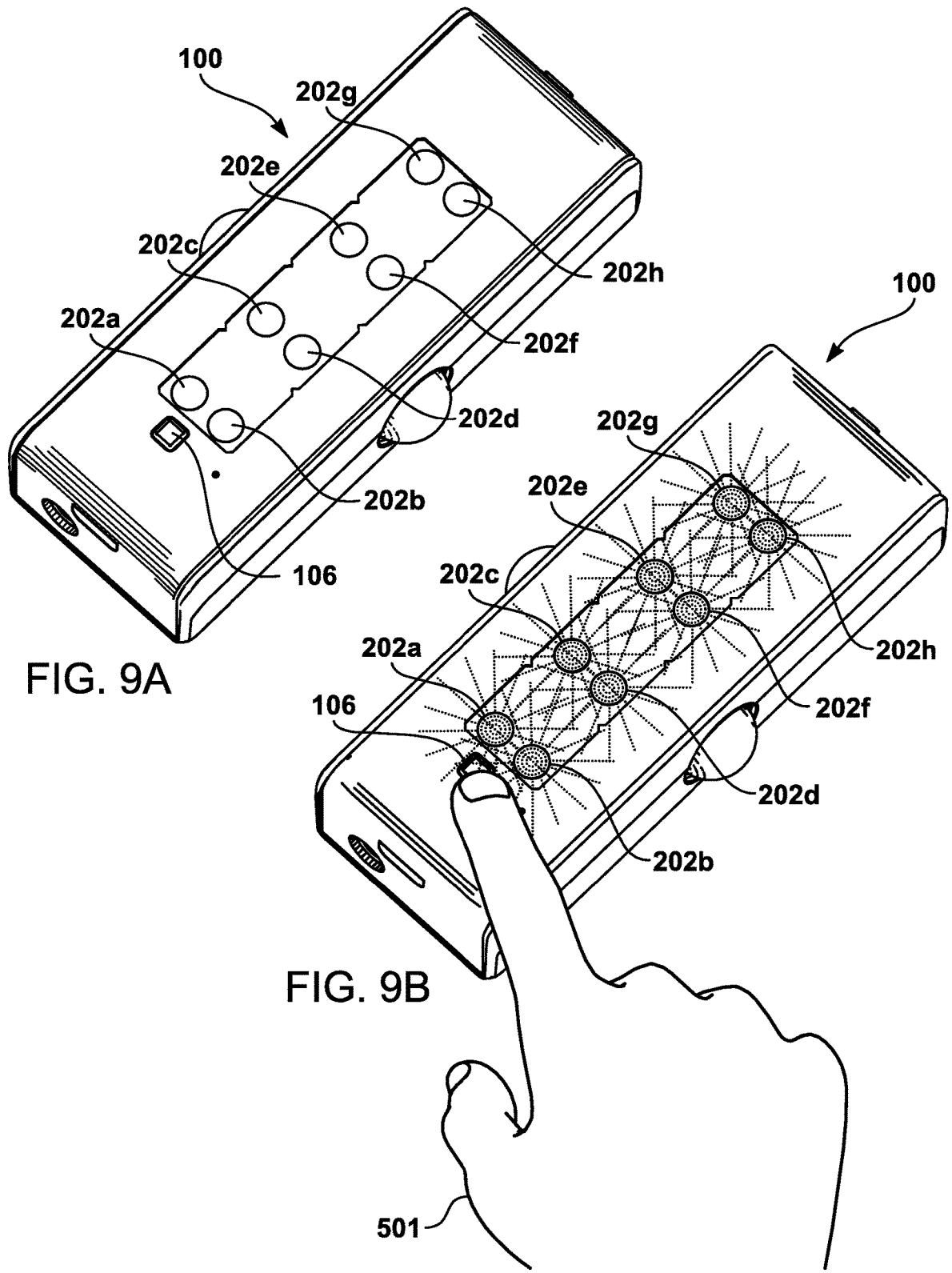

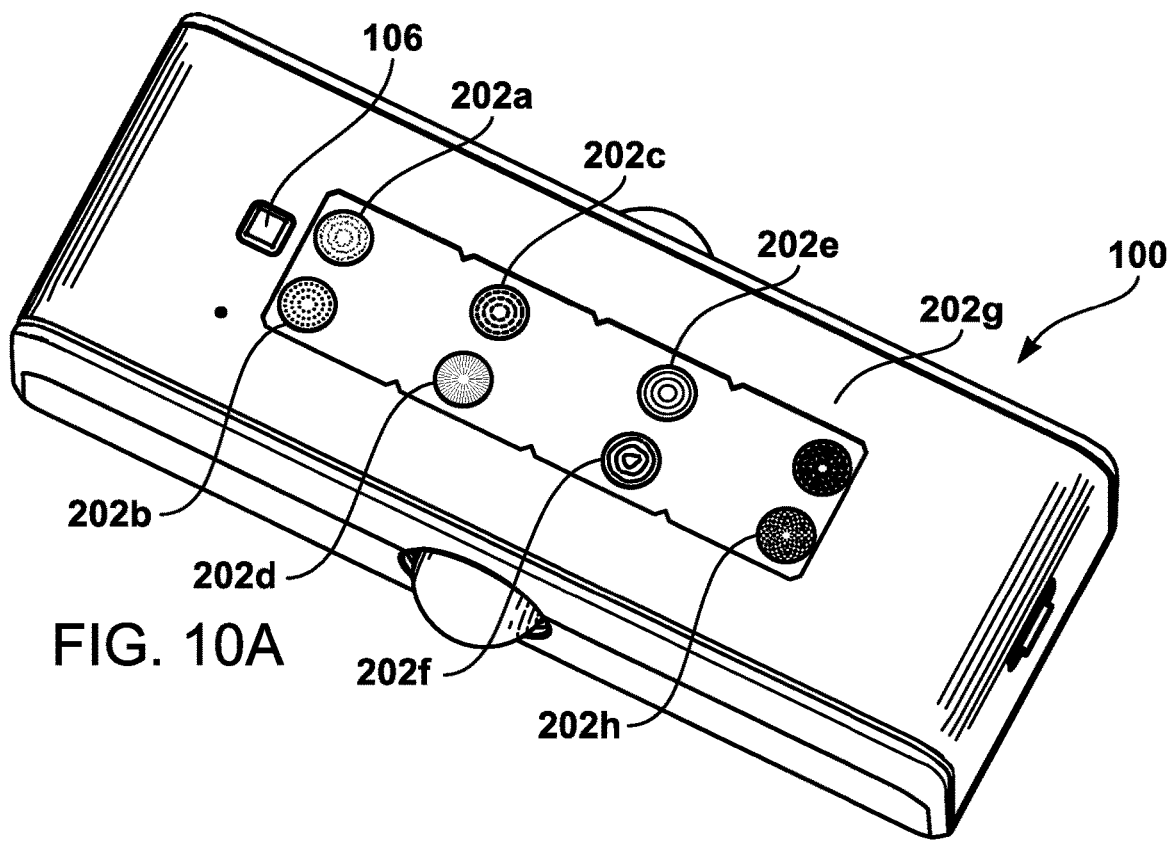

FORWARD FACING MOTION-DETECTING LIGHTING SYSTEM

BACKGROUND

1. Field

This disclosure generally relates to lighting systems. More particularly, the disclosure relates to motion-detected lighting systems.

2. General Background

Lighting systems are often necessary to help ensure the safety of the occupants of a home. For example, at night, lighting systems allow occupants to move about the home from room to room with minimal concern regarding stumbling over, or colliding with, objects.

However, many lighting systems are turned on by a switch. As a result, occupants are often left wandering about their home, in the dark, looking for the switch to turn on the lighting system. Thus, occupants must face potential safety hazards until they find the switch. For certain individuals, such as the elderly or assisted living, such a task may be too overly burdensome. For instance, the elderly or assisted living may be dealing with arthritis or difficulty with motor functions that render walking to a light switch and flipping it quite difficult.

Accordingly, current lighting systems are inadequate for various individuals.

SUMMARY

In one embodiment, a forward facing motion-detected lighting apparatus has an enclosure. Furthermore, the forward facing motion-detected lighting apparatus has a light emission window that is positioned within a first cavity of the enclosure. Additionally, the forward facing motion-detected lighting apparatus has a first surface of the enclosure that surrounds the first cavity along a first plane of the enclosure. Moreover, the forward facing motion-detected lighting apparatus has a plurality of light emitting diodes ("LEDs") that are positioned within the enclosure. Also, the forward facing motion-detected lighting apparatus has at least one motion sensor that protrudes through a second cavity of the enclosure. The forward facing motion-detected lighting apparatus has a second surface of the enclosure that surrounds the second cavity along a second plane of the enclosure. The second plane is perpendicular to the first plane. Furthermore, the forward facing motion-detected lighting apparatus has a processor positioned within the enclosure that detects motion of a user based on data received from the at least one motion sensor. The processor generates a command such that the plurality of LEDs emits one or more light emissions. Finally, the forward facing motion-detected lighting apparatus has one or more connectors that adhere at least a portion of the enclosure to an underside of an object in a physical environment.

In another embodiment, a forward facing motion-detected lighting system has the foregoing forward facing motion-detected lighting apparatus. The forward facing motion-detected lighting system also has a receptacle that adheres to an object in a physical environment. The forward facing motion-detected lighting system has one or more connectors that adhere at least a portion of the enclosure to an underside of the receptacle.

BRIEF DESCRIPTION OF THE DRAWINGS

The above-mentioned features of the present disclosure will become more apparent with reference to the following description taken in conjunction with the accompanying drawings wherein like reference numerals denote like elements and in which:

FIG. 9A illustrates the forward facing motion-detected lighting apparatus prior to activation of color configuration mode.

FIG. 9B illustrates the forward facing motion-detected lighting apparatus after activation of color configuration mode.

FIG. 10A illustrates the LEDs displaying different potential colors after the activation the activator to enter the color configuration.

FIG. 10B illustrates a menu via the LEDs that allows the user to visualize which emitter is going to emit which color.

DETAILED DESCRIPTION

A forward facing motion-detected lighting system is provided to allow for activation of one or more light emitters to be activated based upon motion of the user. Rather than having motion detectors positioned within the same plane as the light emitters, which may lead to difficulty in detecting motion from any meaningful distance (e.g., requires a hand to be positioned directly under a lighting system adhered to a kitchen cabinet), the motion detectors are forward facing toward the user. In other words, the motion detectors may be positioned in a perpendicular plane to that of the light emitters. For example, the light emitters may be facing downwards, but the forward facing motion sensor may be facing toward an approaching user. As a result, the forward facing motion-detected lighting system is able to detect motion of a user from a significant distance (e.g., fifteen to twenty feet away). Further, the light emitted by the light emitters may vary according different colors, thereby providing a lighting environment most conducive to the particular preferences of the user. Moreover, the motion-detected lighting system may be configured to automatically stop emitting light after a predetermined time period has elapsed. As a result, the forward facing motion-detected lighting system is a hassle-free system for activating light emission from a user that is a significant distance away from it.

Furthermore, the forward facing motion-detected lighting system is easy-to-install on the underside of a number of different objects (e.g., kitchen cabinets, staircase rail, shelves, mirrors, etc.). A receptacle may be adhered (e.g., adhesive such as double-sided tape or glue, magnets, clips, etc.) to the intended location via tool-less installation (i.e., without a hammer or screwdriver). (Alternatively, screws, bolts, pins, nails, etc. may be used to adhere the receptacle to the intended location.)

Additionally, in one embodiment, the forward facing motion-detected lighting system may utilize light emitters (e.g., LEDs) that emit light less brightly than standard light bulbs. In contrast with the use of standard light bulbs at night, whereby many users' eyes have to adjust to significant light intensity, the forward facing motion-detected lighting system may utilize LEDs, which emit light in a more comforting way to the eyes of the user. In essence, the forward facing motion-detected lighting system removes the physical coupling between a light bulb and a switch, which is present in many typical configurations.

Figure 1A:
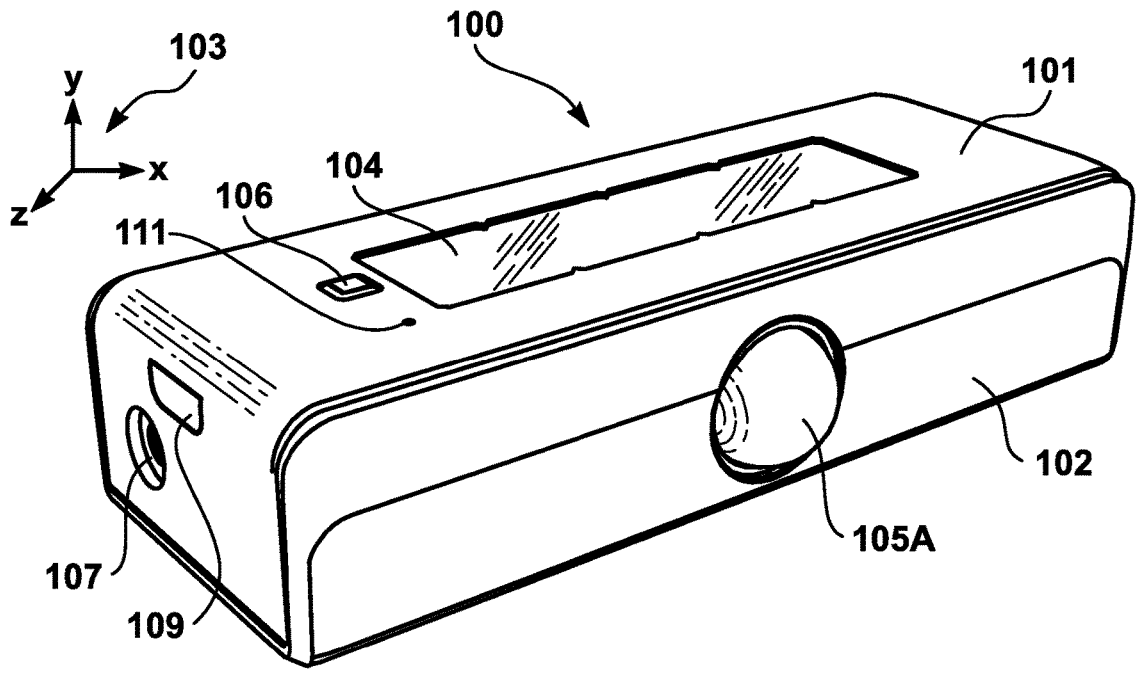
FIG. 1A illustrates a front, side perspective view of a dual bi-directional forward facing motion-detected lighting apparatus.
Figure 1B:
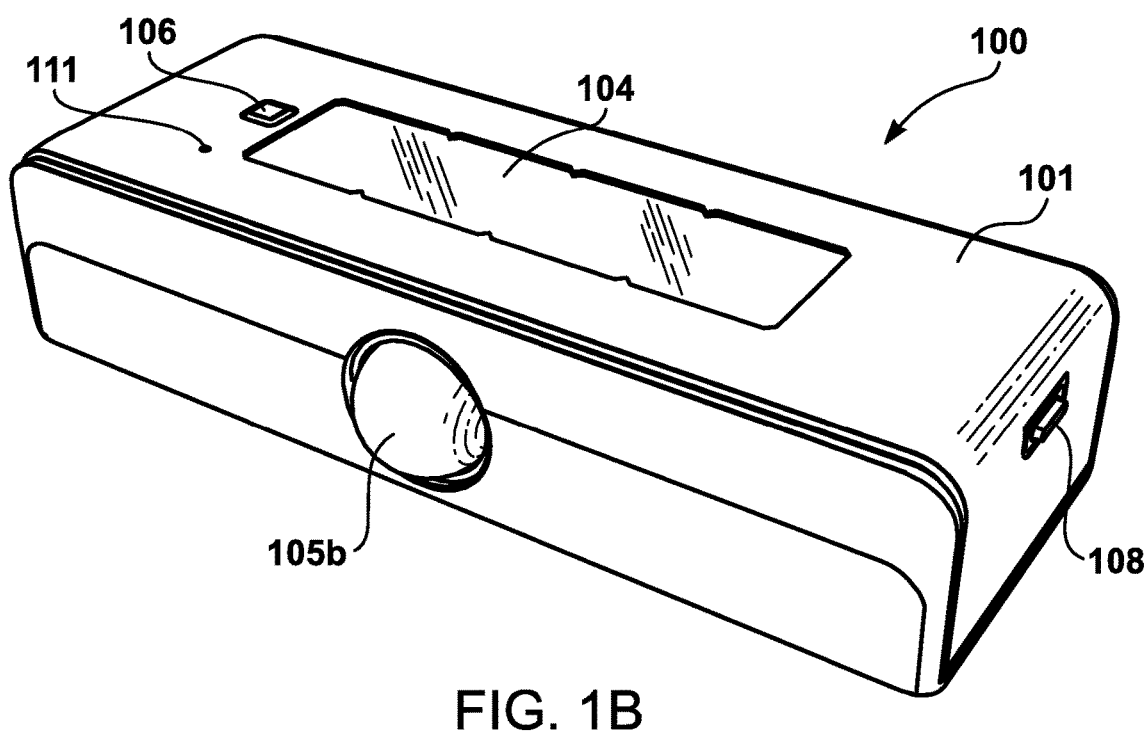
FIG. 1B illustrates a rear, side perspective view of the dual bi-directional forward facing motion-detected lighting apparatus.

FIGS. 1A and 1B illustrate side perspective views of a dual bi-directional dual bi-directional forward facing motion-detected lighting apparatus 100. In particular, FIG. 1A illustrates a front, side perspective view of the dual bi-directional dual bi-directional forward facing motion-detected lighting apparatus 100. Furthermore, FIG. 1B illustrates a rear, side perspective view of the dual bi-directional forward facing motion-detected lighting apparatus 100.

In one embodiment, the dual bi-directional forward facing motion-detected lighting apparatus 100 has a first enclosure section 101 and a second enclosure section 102 that together form a unified enclosure for the dual bi-directional forward facing motion-detected lighting apparatus 100. Various mechanisms (e.g., grooves, magnets, etc.) may be utilized for the first enclosure section 101 and the second enclosure section 102 to engage one another. In an alternative embodiment, the dual bi-directional forward facing motion-detected lighting apparatus 100 may be composed of one unified enclosure, rather than multiple sections. In yet another embodiment, the dual bi-directional forward facing motion-detected lighting apparatus 100 may be composed of more than one enclosure section (e.g., three enclosure sections.).

Additionally, the dual bi-directional forward facing motion-detected lighting apparatus 100 has a light emission window 104 through which one or more LEDs enclosed within the first enclosure section 101 and the second enclosure section 102 emit light. In one embodiment, the light emission window 104 may be a translucent window through which light is minimally refracted or dispersed. In other words, the light emission window 104 may be a clear window through which the LEDs positioned within the first enclosure section 101 and the second enclosure section 102 are visible. In another embodiment, the light emission window 104 may be a light diffuser that disperses the light emitted from the one or more light emitters. For example, the one or more light emitters may be partially, or fully, invisible when viewed from the exterior of the dual bi-directional forward facing motion-detected lighting apparatus 100. The light emission window 104 may be collocated on a plane from a three-dimensional ("3-D") coordinate axis 103, such as the x-axis.

Moreover, the dual bi-directional forward facing motion-detected lighting apparatus 100 has two motion sensors 105a and 105b. For example, the motion sensors 105a and 105b may be collocated on a plane from a three-dimensional ("3-D") coordinate axis 103, such as the z-axis. In other words, the motion sensors 105a and 105b are not aligned on the same plane as the light emission window 104. For instance, as illustrated in FIGS. 1A and 1B, the motion sensors 105a and 105b are located on a z-axis that is perpendicular to the x-axis. Accordingly, when the dual bi-directional forward facing motion-detected lighting apparatus 100 is inverted (e.g., the underside of the dual bi-directional forward facing motion-detected lighting apparatus 100 faces the underside of a kitchen cabinet), at least one of the motion sensors 105a and 105b is facing toward the user, rather than down toward a kitchen countertop.

In one embodiment, the motion sensors 105a and 105b include a geometrically-shaped casing that surrounds a motion sensing element (e.g., an infrared ("IR") sensor that is able to detect movement in the dark). For example, the casing may be a spherical, or semi-spherical (i.e., substantially spherical), shape. By having such a shape, the casing allows for a field of view that provides significant detection of movement. For instance, each of the motion sensors 105a and/or 105b may detect motion within a field of view of approximately one hundred eighty degrees from the motion sensors 105a and/or 105b. (Other fields of view, which are lesser or greater than this example, may be obtained based on different geometrical shapes of the casing.)

The motion sensors 105a and 105b, illustrated as dual motion sensors in FIGS. 1A and 1B, allow for the possibility of the user reorienting the dual bi-directional forward facing motion-detected lighting apparatus 100 such that one side faces a wall (e.g., the wall adjoining a kitchen cabinet). Alternatively, the dual bi-directional forward facing motion-detected lighting apparatus 100 may be positioned such that motion is detected from either side of the dual bi-directional forward facing motion-detected lighting apparatus 100 (e.g., positioning underneath a staircase rail). As a result, the field of view is further enhanced (e.g., three hundred sixty degrees as opposed to one hundred eighty degrees). Thus, the dual bi-directional forward facing motion-detected lighting apparatus 100 is able to detect motion from any angle. In an alternative embodiment, only one motion sensor 105a or 105b may be utilized. In yet another alternative embodiment, more than two motion sensors 105a and 105b may be utilized.

Furthermore, in one embodiment, as illustrated, the motion sensors 105a and 105b are each positioned toward the center of a side, along the x-axis of the 3-D coordinate space 103. However, in an alternative embodiment, one, or both, of the motion sensors 105a and 105b may be positioned along various positions of the side along the x-axis.

In yet another alternative embodiment, one, or both, of the motion sensors 105*a* and 105*b* may be positioned along various positions of the side along the z-axis.

Furthermore, the dual bi-directional forward facing motion-detected lighting apparatus 100 may have an activator 106 that, when activated (e.g., pressed, swiped, tapped, etc.), initiates light emission from the one or more light emitters. Furthermore, the activator 106 may also allow for changing the colors emitted by the one or more light emitters. For instance, the user may press the activator 106 with a tap to turn the light emitters on, and hold the activator 106 for a predetermined amount of time (e.g., four seconds) to enter a color configuration mode in which the color of the light emitted by the light emitters may be modified. For example, the user may be able to view the color emitted by the light emitters through the light emission window 104, and cycle through the different color options via inputs to the activator 106 (e.g., taps) until the desired color is reached. In one embodiment, the user uses the activator 106 to modify all of the light emitted by the light emitters based on a single color. In an alternative embodiment, the user uses the activator 106 to modify the light emitted by the light emitters to emit different colors.

Furthermore, the dual bi-directional forward facing motion-detected lighting apparatus 100 may have a battery supply connector 107 that charges a battery 211. As an example, the dual bi-directional forward facing motion-detected lighting apparatus 100 may be positioned underneath a kitchen cabinet, and be plugged into a wall outlet with an A/C adapter via the battery supply connector 107. Alternatively, the dual bi-directional forward facing motion-detected lighting apparatus 100 may be powered via an internal battery supply that is positioned within the dual bi-directional forward facing motion-detected lighting apparatus 100. For example, an internal rechargeable battery may be used within the dual bi-directional forward facing motion-detected lighting apparatus 100 to avoid having to have external wires/cables.

Optionally, the dual bi-directional forward facing motion-detected lighting apparatus 100 may also have a connector 108 that may be used to connect the dual bi-directional forward facing motion-detected lighting apparatus 100 to other lighting devices/systems. Furthermore, the dual bi-directional forward facing motion-detected lighting apparatus 100 may have an empty cavity for a receiver 109, which may or may not be used for connection purposes (i.e., it may be filled without providing any connection to another device). As another option, the dual bi-directional forward facing motion-detected lighting apparatus 100 may also have a reset activator 111. As yet another option, the dual bi-directional forward facing motion-detected lighting apparatus 100 may have a light guide 110 that directs light emitted from a plurality of additional LEDs 210*a-c*. For example, the top surface of the motion-detected lighting apparatus 100 may be translucent. Accordingly, the additional LEDs 210*a-c* may be configured to emit light of a particular color(s) that is visible to a user through the top surface of the dual bi-directional forward facing motion-detected lighting apparatus 100.

Figure 2A:
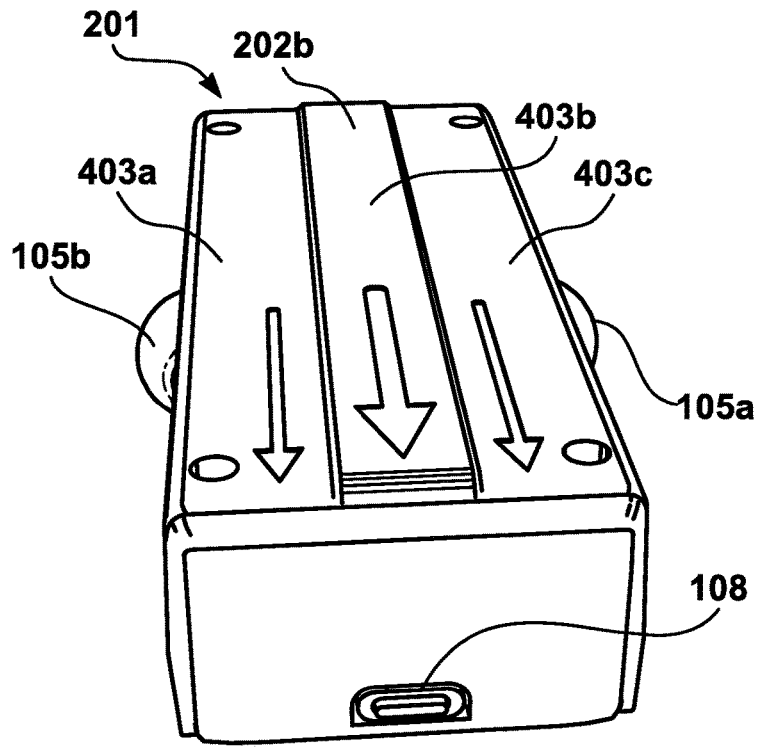
FIG. 2A illustrates a top perspective view of the underside surface of the dual bi-directional forward facing motion-detected lighting apparatus.
Figure 2B:
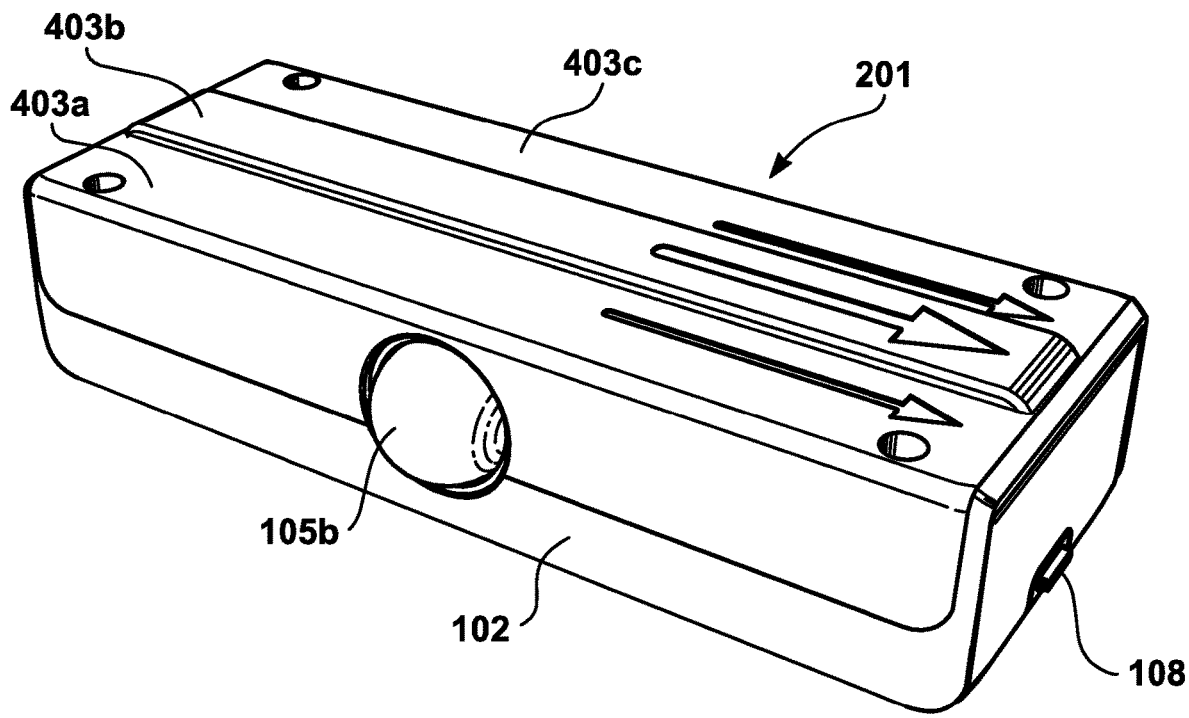
FIG. 2B illustrates a side perspective view of the underside surface of the dual bi-directional forward facing motion-detected lighting apparatus.

FIGS. 2A and 2B illustrate an underside surface 201 of the dual bi-directional forward facing motion-detected lighting apparatus 100, illustrated in FIG. 1. In particular, FIG. 2A illustrates a top perspective view of the underside surface 201. FIG. 2B illustrates a side perspective view of the underside surface 201. Further, the underside surface 201 may include one or more attachment surfaces 403*a-c*, each of which may be used to connect the dual bi-directional forward facing motion-detected lighting apparatus 100 to a receptacle that is adhered to the bottom of a surface (e.g., bottom of a kitchen cabinet). For example, the attachment surfaces 402*a-c* may include one protrusion surface 202*b* that may slide, or lock, into a corresponding receiver within the receptacle. For example, the protrusion surface 202*b* may be a magnetic surface that adheres to another magnetic surface positioned on the receptacle. In an alternative embodiment, the dual bi-directional forward facing motion-detected lighting apparatus 100 may be directly attached to the underside of a cabinet, or other object, without a receptacle.

Figure 3:
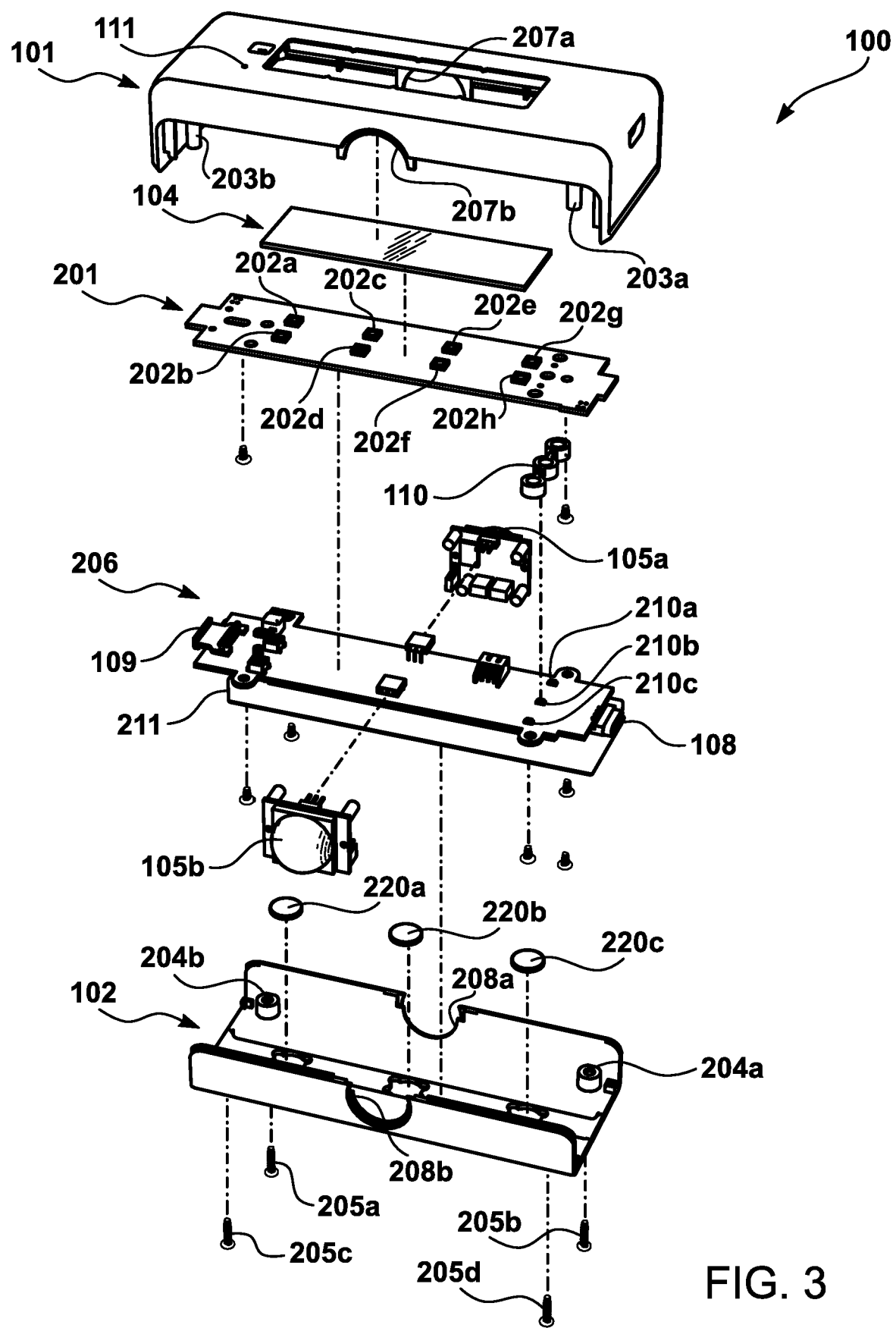
FIG. 3 illustrates a disassembled view of the dual bi-directional forward facing motion-detected lighting apparatus.

Furthermore, FIG. 3 illustrates a disassembled view of the dual bi-directional forward facing motion-detected lighting apparatus 100. In particular, the first enclosure section 101 may have a plurality of first enclosure receivers 203*a* and 203*b* that receive one or more connectors 205*a-d* (e.g., screws, bolts, etc.) through one or more second enclosure receivers 204*a* and 204*b*. Furthermore, the dual bi-directional forward facing motion-detected lighting apparatus 100 may have a plurality printed circuit boards ("PCBs") positioned within the dual bi-directional forward facing motion-detected lighting apparatus 100. For example, the dual bi-directional forward facing motion-detected lighting apparatus 100 may have an LED board 201 on which a plurality of LEDs 202*a-h* are situated. The light emission window 104 may be positioned on top of the LED board 201. Furthermore, the dual bi-directional forward facing motion-detected lighting apparatus 100 may have a processor board 206 on which various processors may be situated for operation of the dual bi-directional forward facing motion-detected lighting apparatus 100. Additionally, the dual bi-directional forward facing motion-detected lighting apparatus 100 may have one or more first enclosure cavities 207*a* and 207*b* through which a portion of the motion sensors 105*a* and 105*b* may protrude, respectively. Similarly, the dual bi-directional forward facing motion-detected lighting apparatus 100 may have one or more second enclosure cavities 208*a* and 208*b* through another portion of the motion sensors 105*a* and 105*b* may protrude, respectively. Additionally, the dual bi-directional forward facing motion-detected lighting apparatus 100 may have positioned therein one or more magnets 220*a-c* for adherence to a receptacle. (Other types of connectors may be utilized instead.)

Figure 4A:
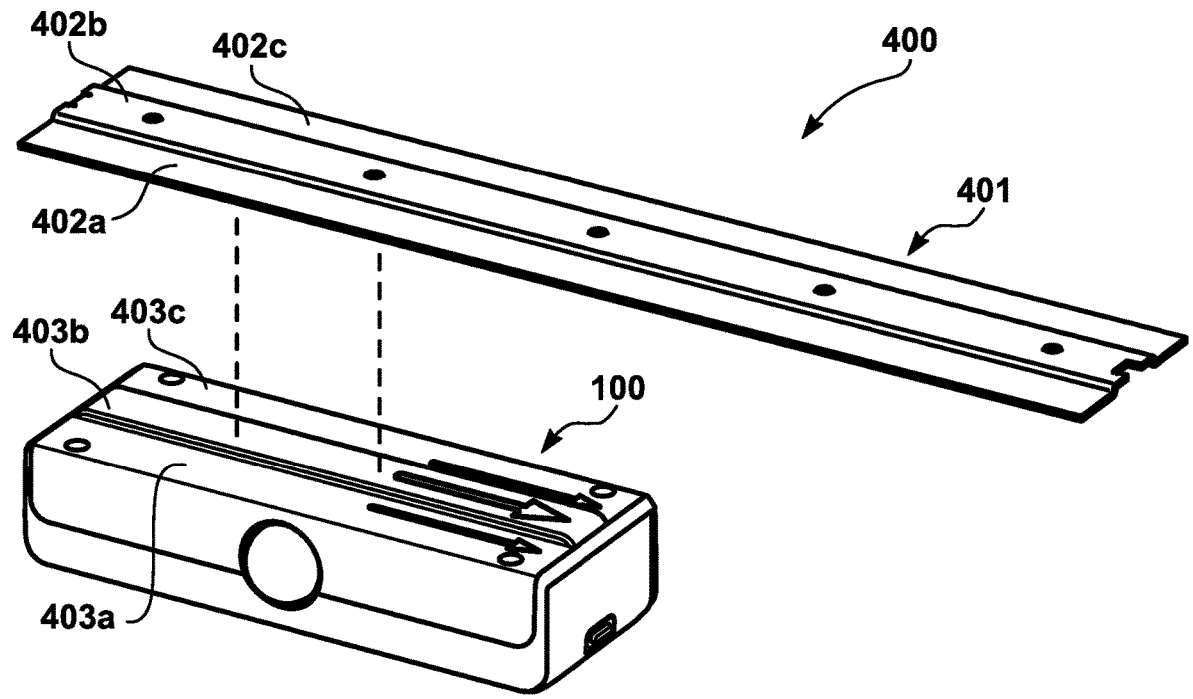
FIG. 4A illustrates the receptacle prior to connection with the dual bi-directional forward facing motion-detected lighting apparatus.
Figure 4B:
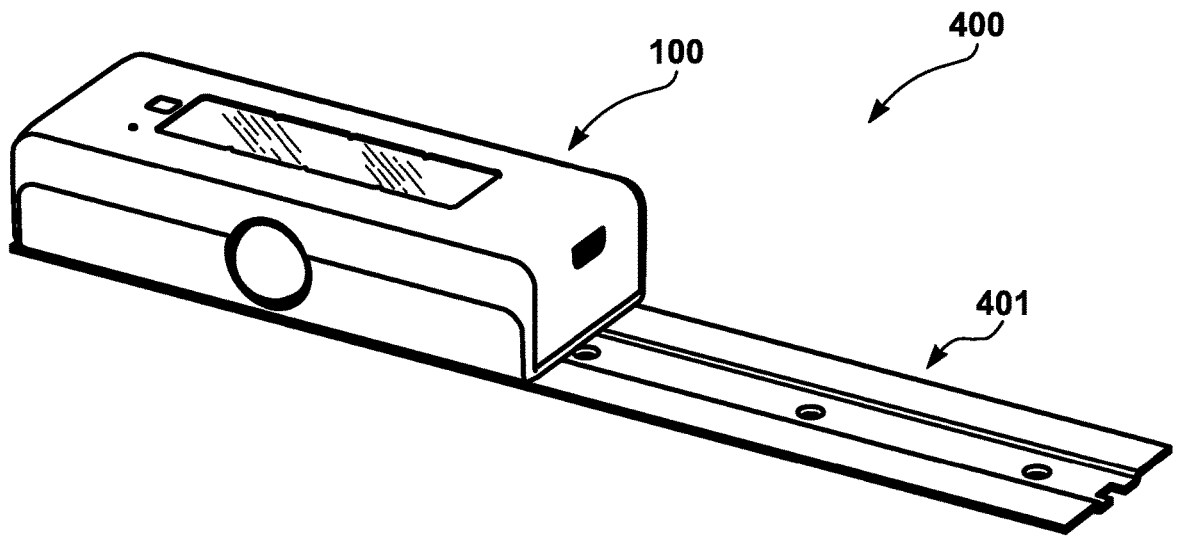
FIG. 4B illustrates the receptacle after connection to the dual bi-directional forward facing motion-detected lighting apparatus.
Figure 5A:
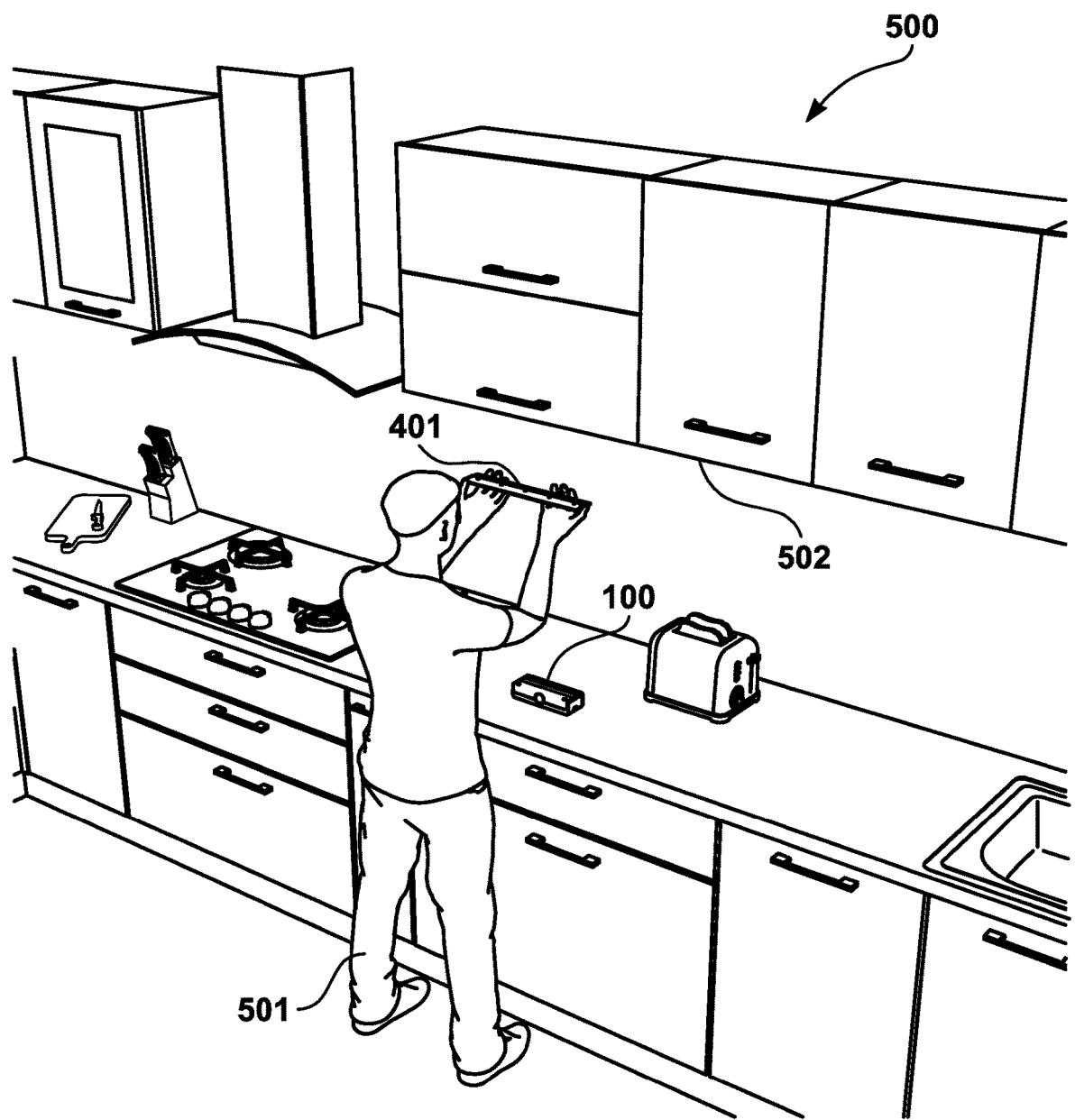
FIG. 5A illustrates the user performing a tool-less installation of the receptacle on the underside portion of the kitchen cabinet.
Figure 5B:
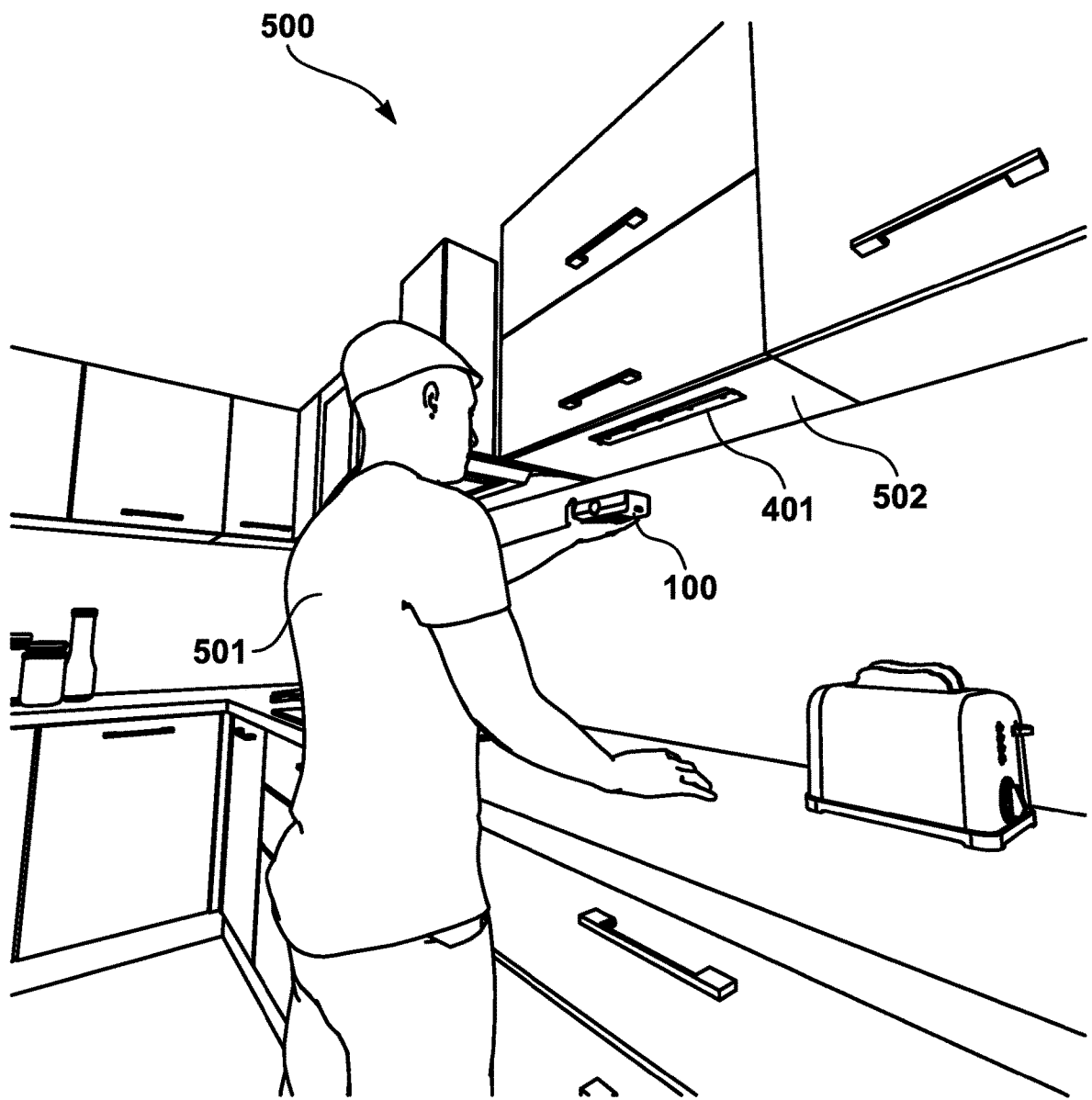
FIG. 5B illustrates the user adhering the dual bi-directional forward facing motion-detected lighting apparatus to the receptacle.

FIGS. 4A and 4B illustrate a forward facing motion-detected lighting system 400 that includes the dual bi-directional forward facing motion-detected lighting apparatus 100 illustrated in FIG. 1 and a receptacle 401. In particular, FIG. 4A illustrates the receptacle 401 prior to connection with the dual bi-directional forward facing motion-detected lighting apparatus 100. Furthermore, FIG. 4B illustrates the receptacle 401 after connection with the dual bi-directional forward facing motion-detected lighting apparatus 100. In one embodiment, the receptacle 401 does not encase the dual bi-directional forward facing motion-detected lighting apparatus 100. In another embodiment, the receptacle 401 at least partially encases the dual bi-directional forward facing motion-detected lighting apparatus 100. The receptacle may have a plurality of surfaces 402*a-c* that may engage the FIGS. 5A and 5B illustrate an example of a physical environment 500 in which a user 501 attempts to adhere the receptacle 401 to an object (e.g., the underside of a kitchen cabinet) within the physical environment. In particular, FIG. 5A illustrates the user 501 performing a tool-less installation of the receptacle 401 on the underside portion of the kitchen cabinet 502. Furthermore, FIG. 5B illustrates the user 501 adhering the dual bi-directional forward facing motion-detected lighting apparatus 100 to the receptacle 401.

Figure 6A:
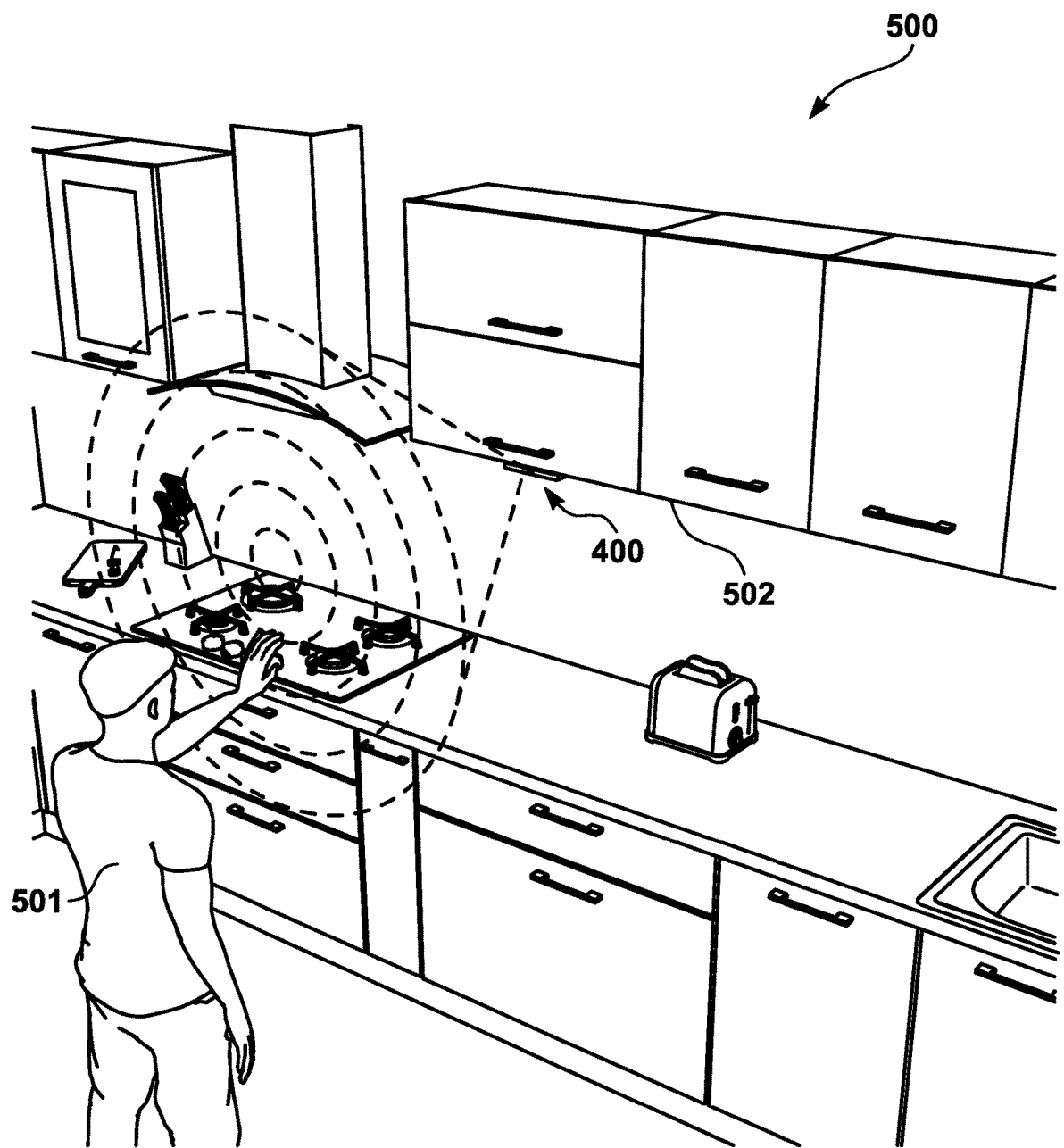
FIG. 6A illustrates the user performing a hand wave motion in front of the dual bi-directional forward facing motion-detected lighting system.
Figure 6B:
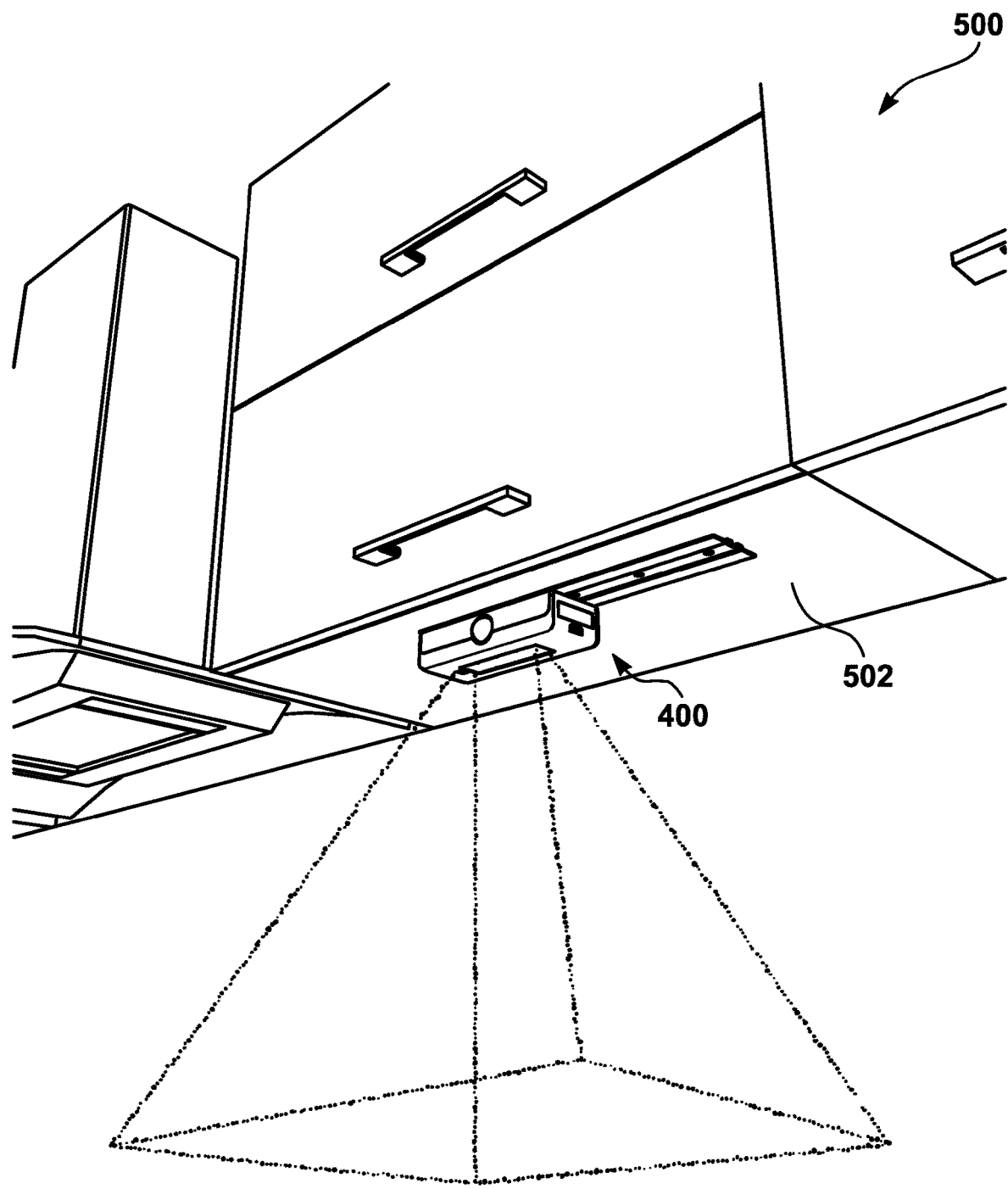
FIG. 6B illustrates the light emitted by the one or more of the plurality of LEDs through the light emission window.

Furthermore, FIGS. 6A and 6B illustrate the user 501 performing motion that activates the forward facing motion-detected lighting system 400 to emit light. In particular, FIG. 6A illustrates the user 501 performing a hand wave motion in front of the forward facing motion-detected lighting system 400. The user 501 may be a considerable distance away from the forward facing motion-detected lighting system 400, and still may be detected as performing the motion. In one embodiment, any motion may activate emission of light by one or more of the plurality of LEDs 202a-202h illustrated in FIG. 3. In another embodiment, at least one of the motion sensors 105a and 105b may be configured to detect only movement according to a predefined pattern. For example, a horizontal hand wave may be necessary to activate light emission if the user 501 wants to avoid light emission being activated based on movement toward the forward facing motion-detected lighting system 400. Accordingly, the forward facing motion-detected lighting system 400 may be configured to recognize one or more patterns (e.g., via an image capture device that captures movements of the user 501 and a processor that performs image analysis). FIG. 6B illustrates the light emitted by the one or more of the plurality of LEDs 202a-202h through the light emission window 104.

Figure 7:
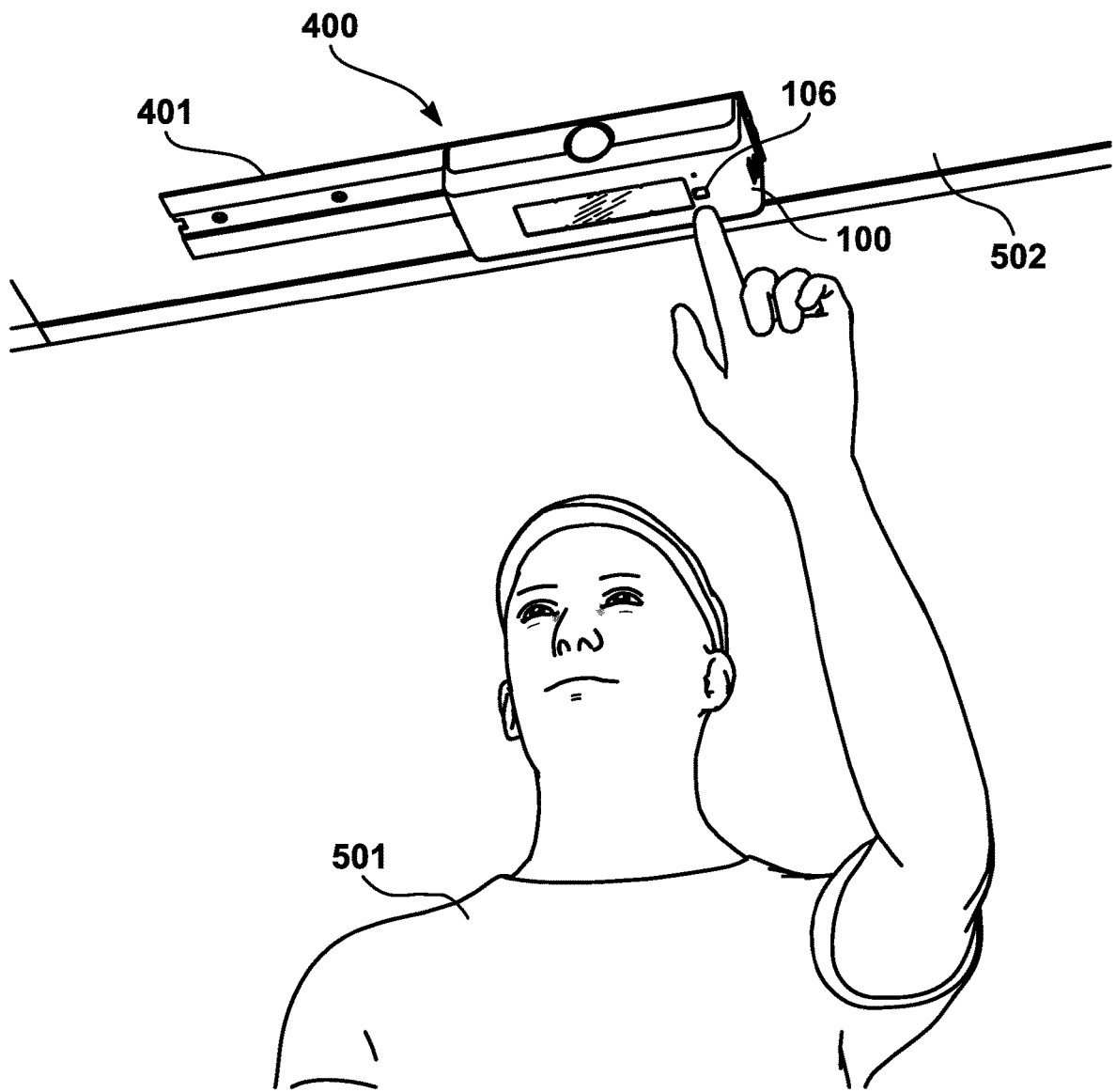
FIG. 7 illustrates the user configuring colors of the light emissions that may be emitted by one or more of the plurality of LEDs illustrated in FIG. 3.

Additionally, FIG. 7 illustrates the user 501 configuring colors of the light emissions that may be emitted one or more of the plurality of LEDs 202a-202h illustrated in FIG. 3. For example, the user 501 may press the activator 106 to enter color configuration mode. The user 501 may view the possible colors through the light emission window 104. Alternatively, the user 501 may remove the dual bi-directional forward facing motion-detected lighting apparatus 100 from the receptacle 401 to provide inputs for color selection without the dual bi-directional forward facing motion-detected lighting apparatus 100 being adhered to the receptacle 401.

Figure 8A:
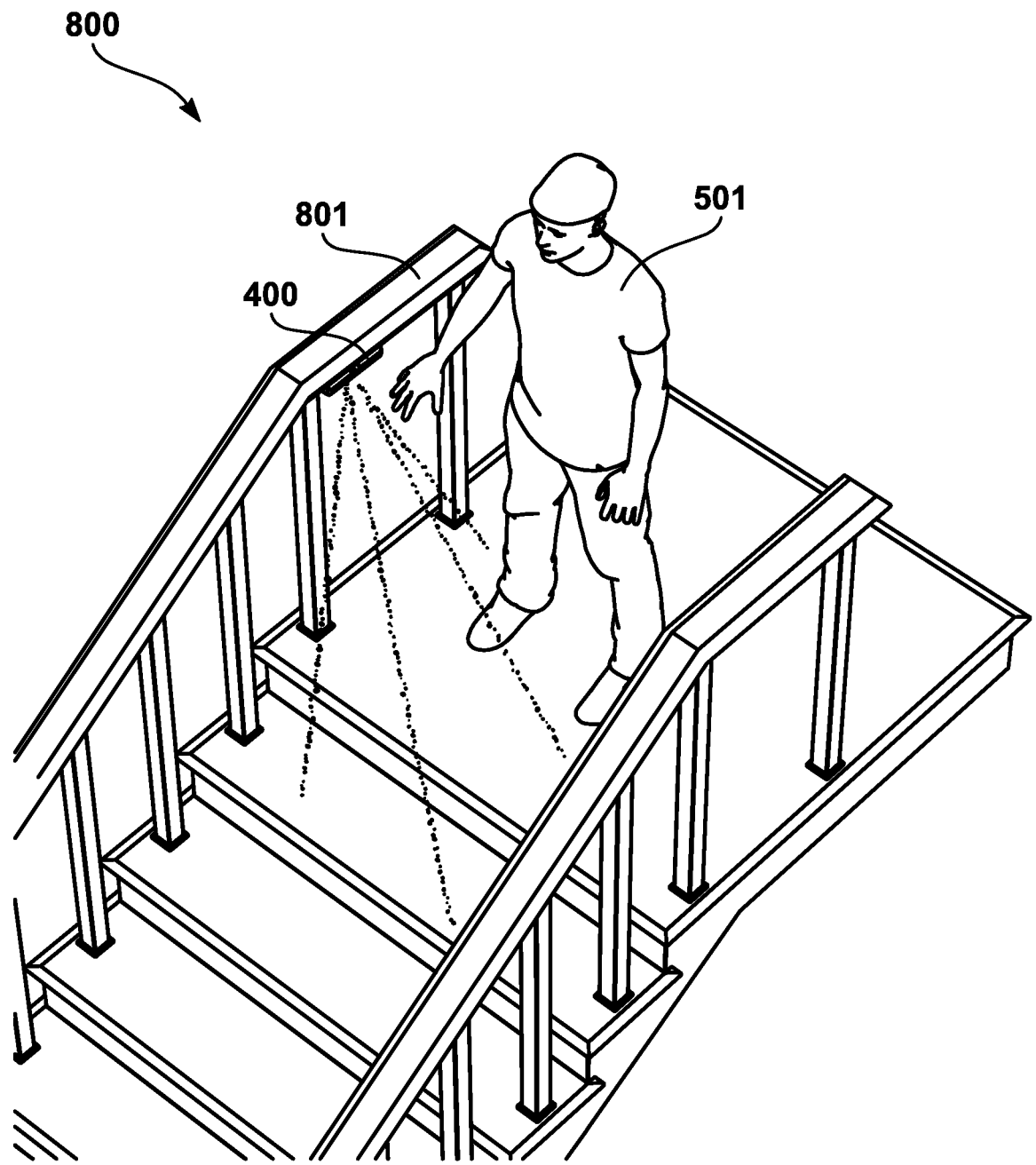
FIG. 8A illustrates a front perspective view of the user performing the activation within the alternative physical environment.
Figure 8B:
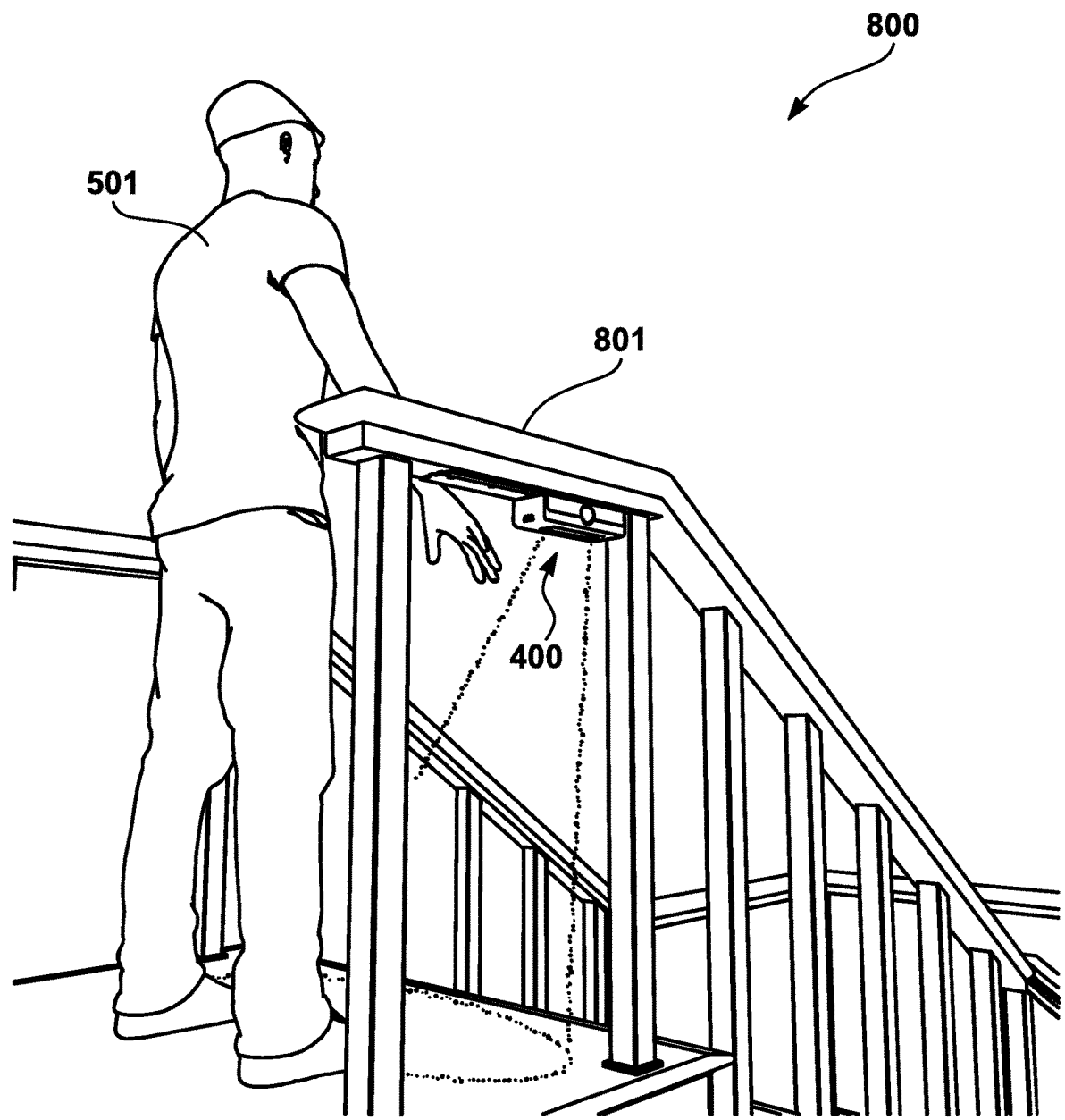
FIG. 8B illustrates a rear perspective view of the user performing the activation within the alternative physical environment.

FIGS. 8A and 8B illustrate another physical environment 800 in which the user 501 may activate the dual bi-directional forward facing motion-detected lighting apparatus 100 to emit light while being adhered to a different object (e.g., the underside of a staircase rail 801). FIG. 8A illustrates a front perspective view of the user 501 performing the activation within the alternative physical environment 800. Further, FIG. 8B illustrates a rear perspective view of the user 501 performing the activation within the alternative physical environment 800.

FIGS. 9A and 9B illustrate use of the activator 106 by the user 501 to select a different color for the light emitted by the LEDs 202a-h. FIG. 9A illustrates the dual bi-directional forward facing motion-detected lighting apparatus 100 prior to activation of color configuration mode. Furthermore, FIG. 9B illustrates the dual bi-directional forward facing motion-detected lighting apparatus 100 after activation of color configuration mode. In particular, the user 501 is illustrated as activating color configuration mode via a touch-based input to the activator 106. Alternatively, a gesture-based input may be detected by the at least one motion sensor 105a or 105b, which may be in operable communication with an image capture device.

FIGS. 10A and 10B illustrate various colors emitted by the LEDs 202a-h of the dual bi-directional forward facing motion-detected lighting apparatus 100 that may be selected by the user 501. For instance, as illustrated by FIG. 10A, after the activation the activator 106 to enter the color configuration, the LEDs 202a-h may display different potential colors. In essence, as illustrated by FIG. 10B, a menu 1101 via the LEDs allows the user 501 to visualize which emitter is going to emit which color. (Patterns are illustrated in the drawings to correspond to colors.)

It is understood that the apparatuses and systems described herein may also be applied in other types of apparatuses and systems. Those skilled in the art will appreciate that the various adaptations and modifications of the embodiments of the apparatuses described herein may be configured without departing from the scope and spirit of the present apparatuses. Therefore, it is to be understood that, within the scope of the appended claims, the present apparatuses may be practiced other than as specifically described herein.

I claim:

1. A forward facing motion-detecting lighting apparatus comprising:
    an enclosure;
    a light emission window that is positioned within a first cavity of the enclosure;
    a first surface of the enclosure that surrounds the first cavity along a first plane of the enclosure;
    a plurality of light emitting diodes that are positioned within the enclosure;
    at least one motion sensor that protrudes through a second cavity of the enclosure;
    a second surface of the enclosure that surrounds the second cavity along a second plane of the enclosure, the second plane being perpendicular to the first plane;
    a processor positioned within the enclosure that detects motion of a user based on data received from the at least one motion sensor, the processor generating a command such that the plurality of light emitting diodes emits one or more light emissions;
    one or more connectors that adhere at least a portion of the enclosure to an underside of an object in a physical environment; and
    an actuator that initiates electrical power, via an electrical power supply, to the plurality of light emitting diodes to emit one or more light emissions based upon a user input provided to the actuator, wherein an additional user input provided to the actuator invokes a color configuration mode at the forward facing motion-detecting lighting apparatus that presents a menu for a plurality of different colors for the plurality of light emissions.

2. The forward facing motion-detecting lighting apparatus of claim 1, wherein the menu is presented through the light emissions windows via the plurality of light emitting diodes.

3. The forward facing motion-detecting lighting apparatus of claim 1, further comprising one or more geometrically-shaped casings that surround the at least one motion sensor.

4. The forward facing motion-detecting lighting apparatus of claim 3, wherein the one or more geometrically-shaped casings are substantially in a shape of a sphere.

5. The forward facing motion-detecting lighting apparatus of claim 1, wherein the at least one motion sensor comprises an infrared sensor.

6. The forward facing motion-detecting lighting apparatus of claim 1, wherein the user input is a touch-based input.

7. The forward facing motion-detecting lighting apparatus of claim 1, wherein the user input is a gesture-based input.

8. The forward facing motion-detecting lighting apparatus of claim 1, wherein the object is a kitchen cabinet.

9. The forward facing motion-detecting lighting apparatus of claim 1, wherein the object is a staircase rail.

10. The forward facing motion-detecting lighting apparatus of claim 1, wherein the object is a shelf.

11. A forward facing motion-detecting lighting system comprising:
- a receptacle that adheres to an object in a physical environment;
- an enclosure;
- a light emission window that is positioned within a first cavity of the enclosure;
- a first surface of the enclosure that surrounds the first cavity along a first plane of the enclosure;
- a plurality of light emitting diodes that are positioned within the enclosure;
- at least one motion sensor that protrudes through a second cavity of the enclosure;
- a second surface of the enclosure that surrounds the second cavity along a second plane of the enclosure, the second plane being perpendicular to the first plane;
- a processor positioned within the enclosure that detects motion of a user based on data received from the at least one motion sensor, the processor generating a command such that the plurality of light emitting diodes emits one or more light emissions;
- one or more connectors that adhere at least a portion of the enclosure to an underside of the receptacle; and
- an actuator that initiates electrical power, via an electrical power supply, to the plurality of light emitting diodes to emit one or more light emissions based upon a user input provided to the actuator, wherein an additional user input provided to the actuator invokes a color configuration mode at the forward facing motion-detecting lighting apparatus that presents a menu for a plurality of different colors for the plurality of light emissions.

12. The forward facing motion-detecting lighting system of claim 11, wherein the menu is presented through the light emissions windows via the plurality of light emitting diodes.

13. The forward facing motion-detecting lighting system of claim 11, further comprising an adhesive that adheres the receptacle to the object.

14. The forward facing motion-detecting lighting system of claim 11, further comprising a plurality of magnets that adhere the enclosure to the receptacle.

15. The forward facing motion-detecting lighting system of claim 11, further comprising one or more geometrically-shaped casings that surround that at least one motion sensor.

16. The forward facing motion-detecting lighting system of claim 15, wherein the one or more geometrically-shaped casings are substantially in a shape of a sphere.

17. The forward facing motion-detecting lighting system of claim 11, wherein the at least one motion sensor comprises an infrared sensor.

18. The forward facing motion-detecting lighting system of claim 11, wherein the user input is a touch-based input.

19. The forward facing motion-detecting lighting system of claim 11, wherein the user input is a gesture-based input.

20. The forward facing motion-detecting lighting system of claim 11, wherein the object is a kitchen cabinet.

* * * * *